United States Patent

Muller

[15] 3,644,215
[45] Feb. 22, 1972

[54] PROCESS FOR CONVERTING LIQUID ANTIOXIDANTS TO PULVERULENT FORM

[72] Inventor: Karl-Hans Muller, Grossauheim, Germany

[73] Assignee: Deutsche Gold-und Silber-Scheideanstalt vormals Roessler, Frankfurt am Main, Germany

[22] Filed: Dec. 2, 1969

[21] Appl. No.: 881,612

[30] Foreign Application Priority Data

Dec. 3, 1968 Germany..................P 18 12 352.9

[52] U.S. Cl. .................................252/404, 99/2 R, 99/19, 117/100 S, 252/384, 252/385, 252/428
[51] Int. Cl. .........................................A23k 3/00, B01j 1/16
[58] Field of Search.................252/397, 404, 384, 385, 428, 252/450; 99/2 R, 15, 19; 117/100 S

[56] References Cited

UNITED STATES PATENTS

| 2,113,216 | 4/1938 | Mitchell | 99/15 |
| 2,703,285 | 3/1955 | Luther | 99/2 |
| 2,949,400 | 8/1960 | Sieger et al. | 252/385 |
| 2,995,447 | 8/1961 | Cipolla et al. | 99/19 |
| 3,085,944 | 4/1963 | Valentine | 252/385 |

*Primary Examiner*—Mayer Weinblatt
*Assistant Examiner*—Irwin Gluck
*Attorney*—Michael S. Striker

[57] ABSTRACT

Liquid antioxidants such as are used in milk replacers and mixed feed compositions are converted to pulverulent form by placing an active, highly dispersed, synthetic silica into a mixing vessel and then spraying or pouring the antioxidant upon the silica while subjecting the mass to a mixing operation.

A homogeneous mixture between the liquid additive and the solid components can thus be obtained even in those cases where the liquid is used only in small amounts.

6 Claims, No Drawings

PROCESS FOR CONVERTING LIQUID ANTIOXIDANTS TO PULVERULENT FORM

CROSS-REFERENCES TO RELATED APPLICATIONS

In an application filed concurrently herewith and relating to an animal feed composition on the basis of a mild replacer by Karl-Hans Muller and Gottfried Kallrath as inventors, a feed composition has been disclosed and claimed for use in which a pulverulent antioxidant is intended. The present application relates to the process of converting the liquid antioxidant to pulverulent form for such use.

BACKGROUND OF THE INVENTION

The antioxidant preferably used in the food composition industry is 5-ethoxy-2,2,4-trimethyl-1,2-dihydroquinoline. Antioxidants of this type are normally added to the feed composition in liquid form in amounts below 0.5 percent by weight of the total composition. A homogeneous mixture between the liquid additive and the solid components of the feed composition in these cases can be attained only with difficulty where the liquid is used in very small amounts.

SUMMARY OF THE INVENTION

It is therefore an object of the invention to provide an antioxidant for use in milk replacers and mixed food compositions in a form which permits a homogeneous admixture of the additive to the solid components of the milk replacer and feed composition.

This object is accomplished by placing an active, highly dispersed, synthetic silica in a mixing vessel and then spraying or pouring the liquid antioxidant upon the silica while subjecting the mass to the mixing operation.

DESCRIPTION OF THE PREFERRED EMBODIMENTS

As has already been mentioned above, the preferred antioxidant of the present invention is 5-ethoxy-22,2,4-trimethyl-1,2-dihydroquinoline. This and similar antioxidants can be converted to a finely dispersed 70 percent concentration powdery concentrate by addition of silica. This type of concentrate can be mixed with the other food composition additives in a completely homogeneous manner within a very short period of time if the liquid additive is incorporated into a finely divided synthetic silica, which has been preplaced into a mixer, by spraying or pouring into the mixer and continuous mixing operation.

The term "silica" as used herein embraces all finely divided, precipitated silicas which are produced by a wet process and, in addition, includes also pyrogenically obtained silicon dioxide.

The amount of the carrier preferably is between 10 and 50 percent by weight relative to the total weight of the antioxidant-silica mixture.

The quality of the silicon dioxide which is used as the carrier material is of substantial significance. It should be a powder wherein the primary particle size is below 500m$\mu$ and preferably is between 3 and 40m$\mu$. The surface of the material should be between 50 and 500 m$^2$/g. and preferably should be between 50 and 300 m$^2$/g. and most preferably between 150 and 250 m$^2$/g. (measured by the BET method).

Particularly suitable is a precipitation-formed, spray-dried, highly dispersed silica of superfine particle size which has a BET surface between 50 and 300 m$^2$/g. and a mean particle size between 10 and 150 $\mu$. The significant features of this type of product are a high-absorption property for liquids of all kinds, a good compatibility with almost all kinds of materials, physiological acceptability and good mixing properties with dry materials.

The silica may, however, also be finely divided, pyrogenically obtained silica having a mean particle size below 500m$\mu$, and preferably between 3 and 40m$\mu$ and a specific BET surface between 50 and 300 m$^2$/g., preferably between 150 and 250 m$^2$/g.

The following example will further illustrate the invention.

EXAMPLE 30 kg. of a precipitated and spray-dried silica was placed in a paddle mixer (a so-called "Loedige" mixer). The 70 kg. of the liquid antioxidant referred to above was then added by spraying and continued mixing.

After completion of the addition, stirring was continued for 3 minutes.

There was thus obtained a powder containing 70 percent of antioxidant which had excellent flow properties and could be packed in bags.

Instead of the paddle mixer, there also could have been used a so-called Nauta mixer, which consists of a cone-shaped receptacle provided with a rotating mixing screw at its interior wall. Also, a fluidizing bed mixer could be used.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

1. A process for converting liquid antioxidants to pulverulent form for use in a milk replacer or mixed feed composition comprising introducing an active, highly dispersed, synthetic silica having a primary particle size below 500 m$\mu$ and a specific BET surface between 50 and 500 m$^2$/g. into a mixing vessel and then introducing liquid 5-ethoxy-2,2,4-trimethyl-1,2-dihydroquinoline as antioxidant onto the silicic acid while subjecting the resulting mass to mixing, "wherein said silica is present in an amount of 10 to 50 percent by weight based on the total mixture of said antioxidant and silica."

2. The process of claim 1 wherein said silica has a primary particle size of between 3 and 40 m$\mu$ and a specific BET surface between 50 and 300 m$^2$/g.

3. The process of claim 1 wherein said silica has a primary particle size of between 3 and 40 m$\mu$ and a specific BET surface between 150 and 250 m$^2$/g.

4. The process of claim 1 wherein said silica is a finely dispersed, precipitation-formed, spray-dried silica having a specific BET surface between 50 and 300 m$^2$/g. and a mean particle size between 10 and 150 m$\mu$.

5. The process of claim 1 wherein said silica is a finely dispersed, pyrogenically obtained silica having a primary particle size below 500 m$\mu$ and a specific BET surface between 50 and 300 m$^2$/g.

6. The process of claim 1 wherein said antioxidant is present in an amount of 70 percent by weight based on the total mixture of said antioxidant and silica.

* * * * *